US012801087B2

(12) United States Patent
Calame

(10) Patent No.: US 12,801,087 B2
(45) Date of Patent: Nov. 17, 2026

(54) DISPLAY OF A TIMEPIECE COMPRISING A MULTIPLE DISPLAY MODULE

(71) Applicant: MANUFACTURE D'HORLOGERIE AUDEMARS PIGUET SA, Le Brassus (CH)

(72) Inventor: Laurent Calame, La Sagne (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 263 days.

(21) Appl. No.: 18/718,254

(22) PCT Filed: Dec. 2, 2022

(86) PCT No.: PCT/IB2022/061691
§ 371 (c)(1),
(2) Date: Jun. 10, 2024

(87) PCT Pub. No.: WO2023/105365
PCT Pub. Date: Jun. 15, 2023

(65) Prior Publication Data
US 2025/0053137 A1 Feb. 13, 2025

(30) Foreign Application Priority Data
Dec. 10, 2021 (CH) ................................ 70690/2021

(51) Int. Cl.
*G04B 19/23* (2006.01)
*G04B 19/26* (2006.01)

(52) U.S. Cl.
CPC ........... *G04B 19/23* (2013.01); *G04B 19/262* (2013.01)

(58) Field of Classification Search
CPC ..... G04B 19/04–19/048; G04B 19/087; G04B 19/22; G04B 19/23; G04B 19/262
See application file for complete search history.

(56) References Cited

U.S. PATENT DOCUMENTS 5,708,628 A 1/1998 Chen
5,745,440 A 4/1998 Chen
(Continued)

FOREIGN PATENT DOCUMENTS

CH 707945 A1 10/2014
DE 102005010604 B3 7/2006
(Continued)

OTHER PUBLICATIONS

International Search Report and Written Opinion of the International Searching Authority issued Jan. 27, 2023, in International Patent Application No. PCT/IB2022/061691, with partial English translation (10 pages).

*Primary Examiner* — Edwin A. Leon
*Assistant Examiner* — Jason M Collins
(74) *Attorney, Agent, or Firm* — BLANK ROME LLP

(57) ABSTRACT

A display (10) of a timepiece has a first indication (12) of a first time zone corresponding to the local time, a second indication (14) of the time of a second time zone and a day/night indicator (21) arranged to make one revolution in 24 hours. The day/night indicator (21) includes a first and a second sector (22, 24) having a different visual appearance and representing day and night respectively. The display (10) further includes a multiple display module (20) with at least a first indicator (26) arranged in a fixed manner in correspondence with the day/night indicator (21) and a second indicator (28) serving as a reference and arranged in correspondence with the day/night indicator (21) in order to indicate at a given instant whether it is day or night at the local time and at the time of the second time zone. A timepiece is provided having the display (10).

13 Claims, 1 Drawing Sheet

(56) References Cited

U.S. PATENT DOCUMENTS

| | | | |
|---|---|---|---|
| 5,917,778 A | 6/1999 | James et al. | |
| 8,036,066 B2 * | 10/2011 | Schlencker .......... | G04B 19/235 368/21 |
| 8,339,900 B2 * | 12/2012 | Muller .................. | G04B 19/23 368/21 |
| 2004/0081027 A1 | 4/2004 | Gilomen | |
| 2005/0105397 A1 * | 5/2005 | Tuason ................ | G04B 19/262 368/21 |
| 2008/0198696 A1 * | 8/2008 | Dias ..................... | G04B 19/025 368/27 |
| 2009/0016174 A1 | 1/2009 | Schlencker et al. | |
| 2011/0032802 A1 | 2/2011 | Muller et al. | |

FOREIGN PATENT DOCUMENTS

| | | | |
|---|---|---|---|
| EP | 2107435 | A1 | 10/2009 |
| JP | 2004144754 | A | 5/2004 |
| JP | 2011516845 | A | 5/2011 |
| JP | 2017116365 | A | 6/2017 |

* cited by examiner

DISPLAY OF A TIMEPIECE COMPRISING A MULTIPLE DISPLAY MODULE

CROSS-REFERENCE TO RELATED APPLICATIONS

This application is a 371 of International Patent Application No. PCT/IB2022/061691, filed on Dec. 2, 2022, which claims the benefit of priority to Switzerland Patent Application No. 070690/2021, filed on Dec. 10, 2021, the contents of which are incorporated herein by reference in their entirety.

TECHNICAL DOMAIN

The present invention relates to a display for a timepiece, comprising a multiple display module combining several indications, as well as to a timepiece comprising this display. The invention relates in particular to a day/night indicator combined with an indication of the local time and at least one indication of the time of another time zone so that the user can read, at a glance, the day/night information associated with each indication and, preferably, can also visualise a time difference between the local time and the time of the other time zone.

PRIOR ART

Timepieces capable of indicating several time zones associated with a day/night display are already known.

By way of example, U.S. Pat. No. 5,917,778 discloses a timepiece that can simultaneously indicate the time in several cities or countries. An adjustable shadow disc is superimposed on a world map. The shadow disc has an adjustable dark portion to indicate the night and an adjustable light portion to indicate the day. The watch movement ensures relative movement between the semi-transparent world map and the adjustable shadow disc.

Other examples of timepieces indicating several time zones associated with a day/night display are disclosed in EP2107435 and U.S. Pat. No. 5,745,440.

A major disadvantage of these timepieces lies in the complexity of the display, which makes it difficult to read the desired information.

BRIEF SUMMARY OF THE INVENTION

One object of the present invention is therefore to provide a display comprising a multiple display module capable of combining a large amount of information while making it possible to simplify the display.

Another object of the invention is to provide a display enabling a user to determine, at a glance, a time difference between the local time and the time of a second time zone, as well as the day/night information associated with the local time and the time of the second time zone.

According to the invention, these objects are achieved in particular by means of a timepiece display comprising a first indication of a first time zone corresponding to the local time, a second indication of the time of a second time zone and a day/night indicator arranged to make one revolution in 24 hours. The day/night indicator comprises a first and a second sector having a different visual appearance and representing day and night respectively. The display further comprises a multiple display module comprising at least one first indicator arranged in a fixed manner in correspondence with the day/night indicator and a second indicator serving as a reference and arranged in correspondence with the day/night indicator in order to indicate at a given instant whether it is day or night at the local time and at the time of the second time zone.

In a preferred embodiment, the multiple display module further comprises a time difference indicator indicating the time difference between the local time and the time of the second time zone.

In an embodiment, the time difference indicator is arranged facing the first and second indicators of the multiple display module. The time difference indicator comprises indexes arranged around the day/night indicator to indicate the number of hours of time difference.

In an embodiment, the position of the second indicator of the multiple display module is adjustable in order to be able to adjust its position to the time of the second time zone.

In an embodiment, the second indicator of the multiple display module is kinematically linked to the second indication corresponding to the time of the second time zone so that a change in time of the second time zone simultaneously corrects the position of the second indicator of the multiple display module.

In an embodiment, the second indicator of the multiple display module is in the form of a hand or a transparent disc comprising a distinctive element.

In an embodiment, the first indicator of the multiple display module is in the form of a bridge defining a window above the day/night display. The window is preferably similar to an angular sector.

In an embodiment, the day/night display is in the form of a disc. The first and second sectors extend on either side of an axis of symmetry of the disc through 180°.

In an embodiment, the day/night display is in the form of a globe.

In an embodiment, the multiple display module is in the form of a counter.

In an embodiment, the counter is arranged at 3, 6, 9 or 12 o'clock in relation to a dial of the display.

Another aspect of the invention relates to a timepiece comprising the display according to the invention.

BRIEF DESCRIPTION OF THE FIGURES

Examples of embodiments of the invention are indicated in the description illustrated by the appended figures in which.

EXAMPLE(S) OF EMBODIMENT OF THE INVENTION

Figure 1:
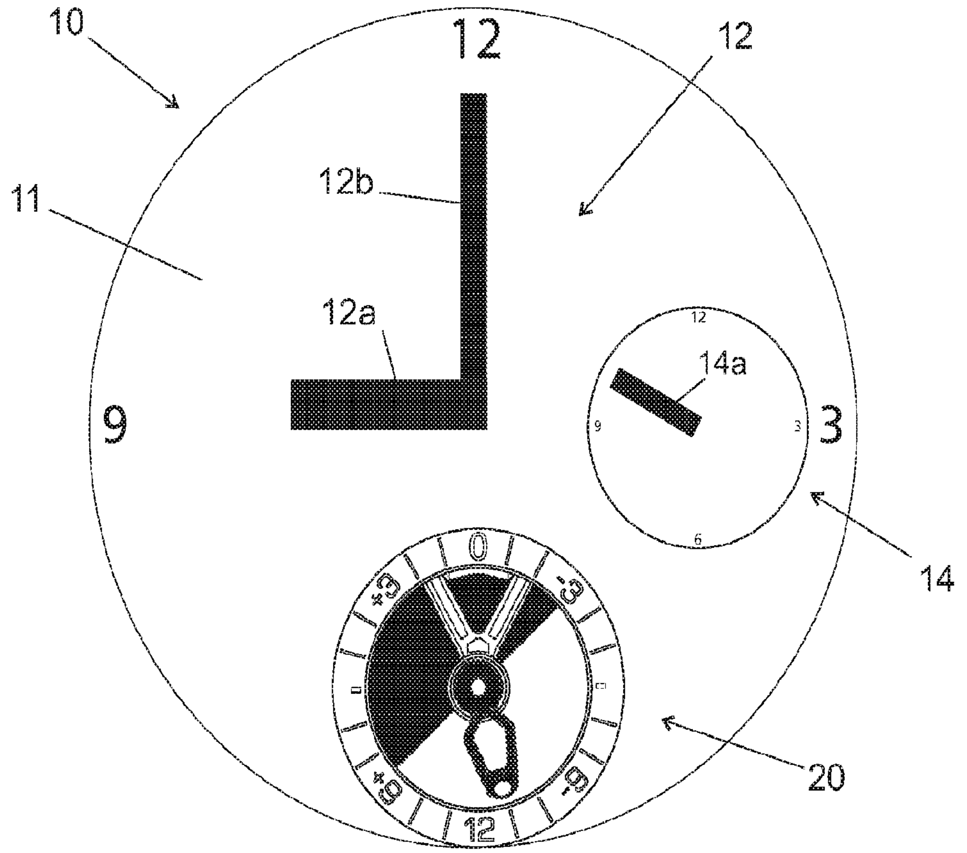
FIG. 1 shows a schematic view of a display for a timepiece, comprising a first indication of a first time zone corresponding to the local time, a second indication of the time of a second time zone and the multiple display module according to an embodiment.
Figure 2:
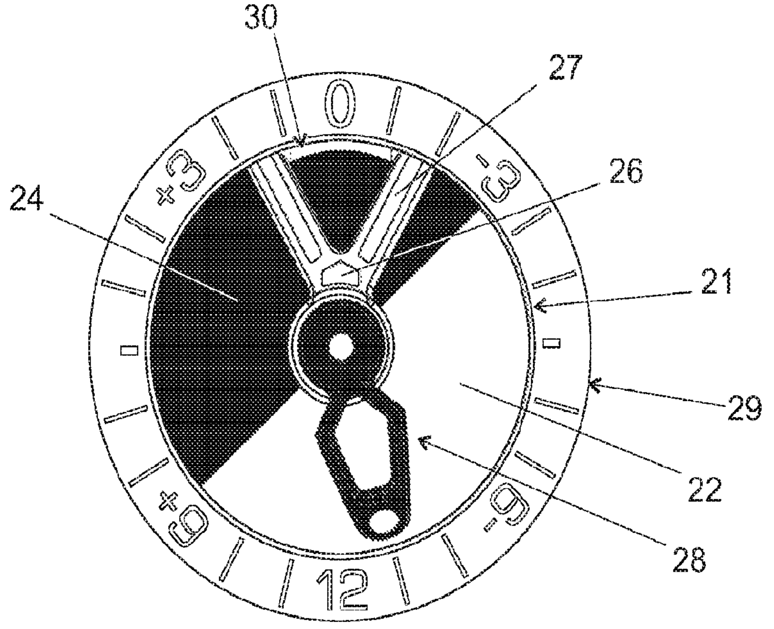
FIG. 2 shows a detailed view of the multiple display module shown in FIG. 1.

According to an embodiment of the invention illustrated by FIGS. 1 and 2, the display 10 of the timepiece comprises a dial 11, a first indication 12 of the local time corresponding to the time of a first time zone and a second indication 14 corresponding to the time of a second time zone. The first indication 12 preferably comprises an hour hand 12*a* and a minute hand 12*b*. The second indication 14 is, for example, in the form of a counter. This counter may, for example, be located at 3 o'clock and may comprise a second hour hand 14*a*.

According to a non-illustrated variant, the time of the second time zone can be displayed by the second hour hand mounted coaxially with the hour hand 12_a_ of the local time.

According to another variant not illustrated, the time of the second time zone can be displayed by means of a disc comprising a reference mark which can be any distinctive element.

The display 10 further comprises a multiple display module 20 located in this example at 6 o'clock. According to FIG. 2, the multiple display module 20 comprises a day/night disc 21 comprising a first and a second angular sector 22, 24 typically extending on either side of an axis of symmetry of the disc over 180°. The day/night disc 21 is conventionally driven clockwise by the timepiece movement at the rate of one revolution in 24 hours.

The multiple display module 20 further comprises a first indicator 26 arranged in a fixed manner above the day/night disc 21 and a second indicator 28 which serves as a reference above the day/night disc 21 in order to indicate at a given instant whether it is day or night at local time and at the time of the second time zone respectively. Preferably the first indicator 26 is located on a bridge 27 defining a window 30 above the day/night disc 21.

The window 30 defined by the bridge 27 is in the form of an angular sector, for example. The second indicator 28 is in the form of a fixed hand. Although this hand is fixed, its angular position can be adjusted by the crown of the timepiece according to the time of the second time zone in the event that the second indication 14 is corrected to indicate another time zone. The second indicator 28 is preferably kinematically linked to the hour hand 14_a_ of the second indication 14 via a gear train.

This gear train may, for example, have a gear ratio of 1:1 so that the correction of the hour hand 14_a_ of the second time zone simultaneously corrects the angular position of the second indicator 28 according to an embodiment in which the time system of the second indication 14 is identical to the time system of the second indicator 28, for example a 12 h or 24 h time system.

The multiple display module 20 also includes a time difference indicator 29 indicating the time difference between the local time and the time of the second time zone. In the example shown, the time difference indicator 29 is based on a 12-hour time system. This indicator 29 comprises indexes arranged on the dial 11 around the day/night disc 21 facing the fixed hand 28. The time difference indicator 29 therefore preferably adopts a typically annular shape.

According to a non-illustrated variant, the second indication 14 can be adapted for a 12 h time system while the multiple display module 20 can be based on a 24 h time system. In this case, a gear train may be provided, with a gear ratio of 2:1, meshing with the hour hand 14_a_ of the second time zone and with the second indicator 28 of the multiple display module 20. In this way, correction by the crown of the timepiece enables the simultaneous correction of the hour hand 14_a_ of the second time zone and of the second indicator 28 of the multiple display module 20, while taking into account the different time systems.

According to a non-illustrated variant, the correction of the second indicator 28 of the multiple display module 20 can be corrected by a one-hour jump, for example by means of a push-button. Similarly, the correction of the time of the second time zone is not necessarily carried out by the crown of the timepiece but by means of a mechanism with one +1 h pusher or two +1 h, −1 h pushers to advance or move back, by a one-hour jump, the time of the second time zone by applying one or more pressures on one or the other of the pushers depending on the desired time.

According to the example illustrated in FIG. 1, the first indication 12 indicates 9 o'clock in the evening for the local time while the second indication 14 indicates 10 o'clock in the morning of the same day for the second time zone. According to FIG. 2, the second indicator 28 of the multiple display module 20 therefore indicates a time difference of −11 h on the time difference indicator 29, informing the user that the local time is 11 h ahead of the second time zone.

Also, the user can read, at a glance, that it is night in the zone corresponding to the local time and day in the zone corresponding to the second time zone. In other words, this day/night indication helps to remove the ambiguity of the time indication of the second time zone. Thus, in the example shown in FIG. 2, the user is immediately informed that the 10 o'clock indication, given by the second hour hand 14_a_ pertaining to the second time zone, corresponds to 10 o'clock in the morning and not to 10 o'clock in the evening.

The user can furthermore determine on the multiple display module 20 that the sun will set in 8 hours (11 am-3 am) in the zone corresponding to the second time zone, whereas he can directly read, on the time difference indicator 29, that the day will rise in 9 hours in the zone corresponding to the local time. Obviously, this indication may vary somewhat depending on the season and the latitude where the user of the timepiece is located.

The multiple display module 20 therefore allows intuitive reading of a large amount of information combined in a simplified display. This simplified display has the advantage that it can be driven by any type of movement since only the day/night disc 21 is driven by the movement.

The display illustrated is only one embodiment among others covered by the appended claims. For example, the multiple display module 20 could comprise more than two indicators in order to inform the user of a time difference between the local time and at least a third time zone and of information relating to the day or night associated with the zone corresponding to this third time zone. In this case, display 10 would also include a third time indication for this third time zone.

In addition, the first and second indicators 26, 28 could be in the form of marks arranged at the level of the time difference indicator 29 without extending above the day/night indicator 21.

According to a non-illustrated variant, the day/night disc of the multiple display module 20 can be replaced by a globe.

Furthermore, according to a non-illustrated variant, the hand 28 of the multiple display module 20 can be replaced by a transparent disc arranged on the day/night disc 21 so that the latter is visible through the transparent disc. The transparent disc includes a marker or distinctive element arranged in front of the time difference indicator 29 in order to indicate the time difference between local time and the second time zone.

The invention claimed is:

1. Display of a timepiece, comprising a first indication of a first time zone corresponding to a local time, at least one second indication of a time of a second time zone and a day/night indicator arranged to make one revolution in 24 hours, the day/night indicator comprising a first and a second sector having a different visual appearance and representing day and night respectively, wherein the display further comprises a multiple display module comprising at least one first indicator arranged in a fixed manner in correspondence with the day/night indicator and a second indicator serving as a reference and arranged in correspondence with the day/night indicator, and wherein said first and second indicators are arranged to indicate at a given instant whether it is day or night respectively at the local time and at the time of the second time zone.

2. Display of claim 1, wherein the multiple display module further comprises a time difference indicator indicating the time difference between the local time and the time of the second time zone.

3. Display of claim 2, wherein the time difference indicator is arranged facing the first and second indicators and comprises indexes arranged around the day/night indicator to indicate the time difference.

4. Display of claim 1, wherein a position of the second indicator of the multiple display module is adjustable in order to be able to adjust its position to the time of the second time zone.

5. Display of claim 4, wherein the second indicator of the multiple display module is kinematically connected to the second indication so that a time change of the second indication simultaneously corrects the position of the second indicator.

6. Display of claim 1, wherein the second indicator of the multiple display module is in the form of a hand or a transparent disc comprising an indicator.

7. Display of claim 1, wherein the first indicator of the multiple display module is located on a bridge above the day/night indicator.

8. Display of claim 7, wherein the bridge partly defines a window through which part of the day/night indicator is visible.

9. Display of claim 8, wherein the window resembles an angular sector.

10. Display of claim 1, wherein the day/night indicator is in the form of a disc, the first and second sectors extending on either side of an axis of symmetry of the disc through 180°.

11. Display of claim 1, wherein the day/night indicator is in the form of a globe.

12. Display of claim 1, wherein the multiple display module is in the form of a circular counter arranged at 3, 6, 9 or 12 o'clock in relation to a dial of the display.

13. Timepiece comprising the display of claim 1.

* * * * *